(12) United States Patent
Husistein

(10) Patent No.: US 7,614,318 B2
(45) Date of Patent: Nov. 10, 2009

(54) RECIRCULATING BALL SCREW AND NUT DRIVE

(75) Inventor: Kurt Husistein, Burg AG (CH)

(73) Assignee: Eichenberger Gewinde AG, Burg AG (CH)

( * ) Notice: Subject to any disclaimer, the term of this patent is extended or adjusted under 35 U.S.C. 154(b) by 252 days.

(21) Appl. No.: 11/689,747

(22) Filed: Mar. 22, 2007

(65) Prior Publication Data

US 2008/0016973 A1    Jan. 24, 2008

(30) Foreign Application Priority Data

Jul. 18, 2006    (CH) .................................... 1153/06

(51) Int. Cl.
*F16H 1/24*    (2006.01)
(52) U.S. Cl. ................. 74/424.87; 74/424.83
(58) Field of Classification Search ............. 74/424.81, 74/424.82, 424.83, 424.84, 424.86, 424.87
See application file for complete search history.

(56) References Cited

U.S. PATENT DOCUMENTS 4,286,793 A * 9/1981 Ploss et al. .................. 277/354
4,864,883 A * 9/1989 Mayfield ................. 74/424.87
5,664,459 A * 9/1997 Muhleck et al. .......... 74/424.87
6,938,510 B2    9/2005 Yabe
7,350,434 B2 * 4/2008 Nishimura et al. ....... 74/424.86
2007/0186708 A1 * 8/2007 Liao et al. ................ 74/424.86

FOREIGN PATENT DOCUMENTS

DE    60301517    1/2006
GB    957330    5/1964

* cited by examiner

*Primary Examiner*—Richard W L Ridley
*Assistant Examiner*—Terence Boes
(74) *Attorney, Agent, or Firm*—Greenblum & Bernstein, P.L.C.

(57) ABSTRACT

A recirculating ball screw and nut drive including a spindle, a spindle nut guided on the spindle, balls guided between the spindle and the spindle nut, in a working passage defined by grooves of the spindle and spindle nut, and deflection pieces arranged on both ends of the spindle nut to divert the balls out of the working passage into a return passage accommodated in the spindle nut, and to divert the balls out of the return passage into the working passage accommodated in the spindle nut, where the ball deflection pieces are annular and composed of at least two circular-ring sectors.

5 Claims, 3 Drawing Sheets

RECIRCULATING BALL SCREW AND NUT DRIVE

CROSS-REFERENCE TO RELATED APPLICATIONS

The present application claims priority under 35 U.S.C. §119 of Swiss Patent Application No. 01153/06, filed on Jul. 18, 2006, the disclosure of which is expressly incorporated by reference herein in its entirety.

BACKGROUND OF THE INVENTION

1. Field of the Invention

The invention relates generally to a recirculating ball screw and nut drive with a spindle and with a spindle nut guided on the spindle, as well as with balls guided between the spindle and the spindle nut, in a working passage between their thread grooves, where the balls are diverted in ball deflection pieces on both ends of the spindle nut out of the working passage into a return passage accommodated in the spindle nut, and vice versa.

2. Discussion of Background Information

A recirculating ball screw and nut drive is generally disclosed in GB-PS-957330. This recirculating ball screw and nut drive includes a spindle and a spindle nut guided on the spindle with balls guided between their thread grooves in a working passage. Both the spindle nut and the spindle have a single-start thread. In order to change the ratio of the feed of the spindle nut to the rotation of the spindle, the pitch of the threads should be changed. However, with a large pitch of the threads, the load-carrying capacity of the ball screw and nut drive decreases with a constant length of the spindle nut, because fewer balls can engage in a load-carrying manner with the opposite grooves. As a remedy, a multiple-start thread is used for the spindle and for the spindle nut. However, the ball deflection piece provided for a single-start thread can no longer be used.

Another recirculating ball screw and nut drive with two ball deflection pieces attached to the two ends of the spindle nut is generally disclosed in DE-T2-60301517, where the ball deflection pieces are suitable for a spindle and spindle nut having a multiple-start thread. For each working passage lying between the threads and for each associated return passage, the ball deflection piece made of one piece features one ball circulation passage connecting these passages. However, this ball deflection piece is complicated and requires expensive manufacturing and mounting.

SUMMARY OF THE INVENTION

According to one embodiment, the present invention provides a recirculating ball screw and nut drive, for which the ratio of the feed of the spindle nut to the rotation of the spindle can be increased as required by a multiple-start thread and a simple, cost-effective and easily mountable ball deflection piece can be used thereby.

According to one embodiment, the ball deflection pieces are annular and are assembled from at least two identically embodied circular-ring sectors, and each circular-ring sector carries a part of a deflection head divided in a plane tangential to the spindle, projecting axially in the direction of the return passage orifice and radially on the circumference of the ball deflection piece, and the adjacent circular-ring sectors abut on one another in the deflection head in the plane tangential to the spindle and are held together by pin/blind hole connection, and the ball circulation passage begins in the working passage and ends in the deflection head directly before the return channel orifice, whereby the ball circulation passage is guided partly in the parting surfaces facing one another of the circular-ring sectors. With this arrangement one circular-ring sector can be assigned to each return passage. The substantially identical circular-ring sectors of the ball deflection piece are inexpensive to produce and easy to mount. With a divided ball deflection piece it is possible to insert multiple-start threads. A relatively large thread pitch with multiple-start threads can thus be chosen. The numerous balls running thereby between the multiple-start threads in multiply guided working passages are sufficient for absorbing even relatively large mechanical stresses. The divided ball deflection pieces inserted at the ends of the spindle nut can make it possible to return the balls into the associated return passages, and vice versa. During mounting, the circular-ring sectors can be connected to one another and combined into one piece with the pin/blind hole connection to form the ball deflection piece, and can thus be inserted and mounted into the spindle nut as one piece.

One advantage of the present invention is that the deflection head projecting on the circumference of the ball deflection piece is placed into a radially directed recess in the spindle nut body, which protects the deflection piece against twisting.

According to one embodiment of the invention, the ball deflection piece can be held in an annular recess in the spindle nut body by a snap ring. This construction can provide a simple, inexpensive mounting of the ball deflection piece.

According to one embodiment of the invention, an annular groove with a slanted orifice tapering outward is provided in the spindle nut body to hold the snap ring. This construction can provide for the natural outward movement of the ball deflection piece to be absorbed and pushed back during operation.

According to one embodiment, the present invention provides a recirculating ball screw and nut drive including a spindle, a spindle nut guided on the spindle, balls guided between the spindle and the spindle nut, in a working passage defined by grooves of the spindle and spindle nut, and deflection pieces arranged on both ends of the spindle nut to divert the balls out of the working passage into a return passage accommodated in the spindle nut, and to divert the balls out of the return passage into the working passage accommodated in the spindle nut, where the ball deflection pieces are annular and composed of at least two circular-ring sectors.

According to one embodiment, the present invention further provides deflection heads coupled in part to each circular-ring sector, such that the deflection head is divided in a plane tangential to the spindle when mounted on the spindle nut, wherein the deflection heads project axially in the direction of the return passage orifice and radially on the circumference of the ball deflection pieces, and a pin and blind hole formed on the at least two circular-ring sectors to hold the ring sectors together in the vicinity of the deflection head in the plane tangential to the spindle.

According to one embodiment, the present invention further provides that the circular-ring sectors further include ball circulation passages arranged between the working passage and the return passage, which are formed in part in facing surfaces of the circular-ring sectors facing one another.

According to one embodiment, the present invention further includes a radially directed recess in the spindle nut body, wherein the deflection head projecting radially on the circumference of the ball deflection piece is placed into the radially directed recess in the spindle nut body to protect the ball deflection piece from twisting.

According to one embodiment, the present invention further includes a snap ring arranged to hold the ball deflection piece in an annular recess in the spindle nut body.

According to one embodiment, the present invention further provides that the spindle nut body comprises an annular groove with a slanted orifice tapering outward to hold the snap ring.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figures 1, 2:
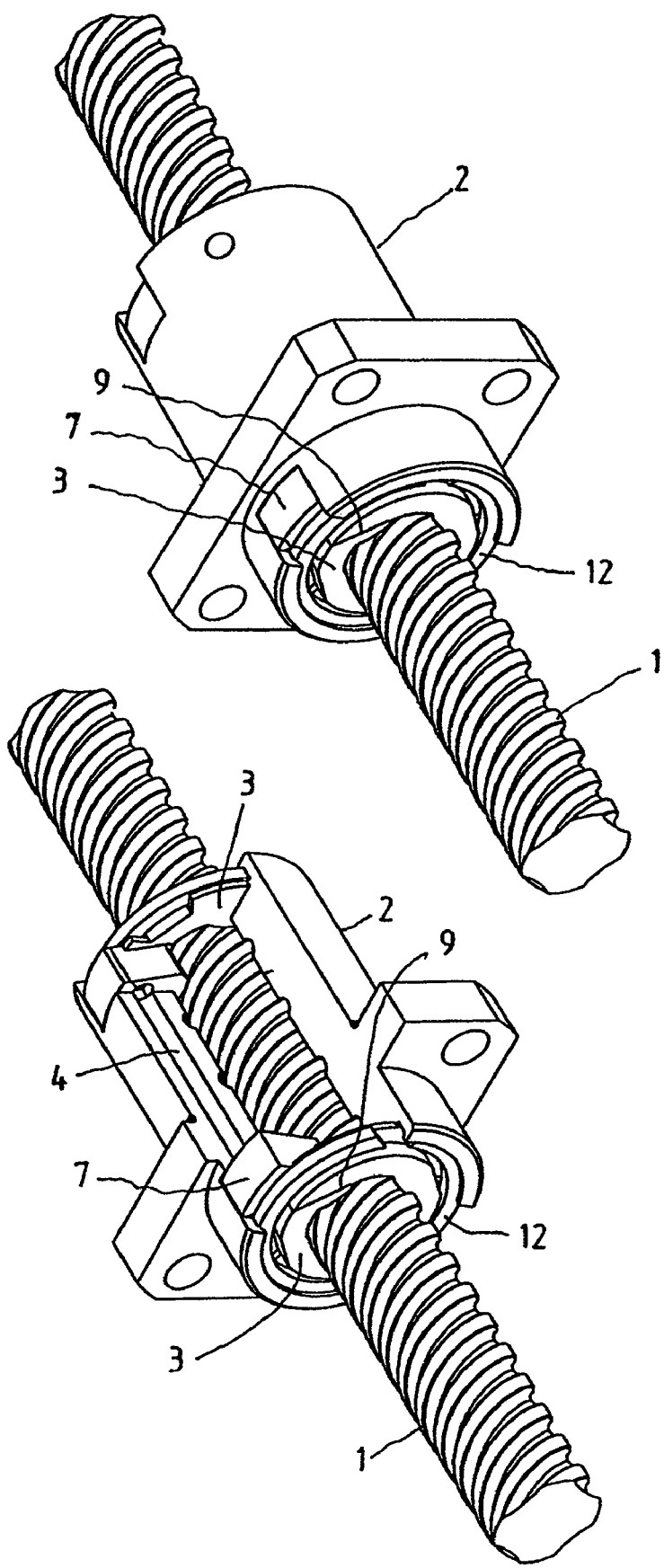
FIG. 1 represents a recirculating ball screw and nut drive with spindle and spindle nut.
FIG. 2 represents a perspective view of a recirculating ball screw and nut drive in a partial section.

FIG. 1 shows diagrammatically a recirculating ball screw and nut drive with a spindle 1 and with a spindle nut 2 guided on the spindle. A working passage is generated between the thread grooves of the spindle 1 and the spindle nut 2, in which working passage the balls (not shown) are guided. The balls are diverted in ball deflection pieces 3 on both ends of the spindle nut 2 out of the working passage into a return passage 4 accommodated in the spindle nut 2, and vice versa.

FIG. 2 shows diagrammatically the recirculating ball screw and nut drive in a perspective view in partial section, where the ball deflection pieces 3 and the return passage 4 are visible. In one embodiment of the present invention, in order to protect the ball deflection piece 3 against twisting, and a radial recess can be provided in the spindle nut body 2, into which the deflection head 7, 8 can be placed, as can be seen, for example, in FIG. 2.

Figure 3:
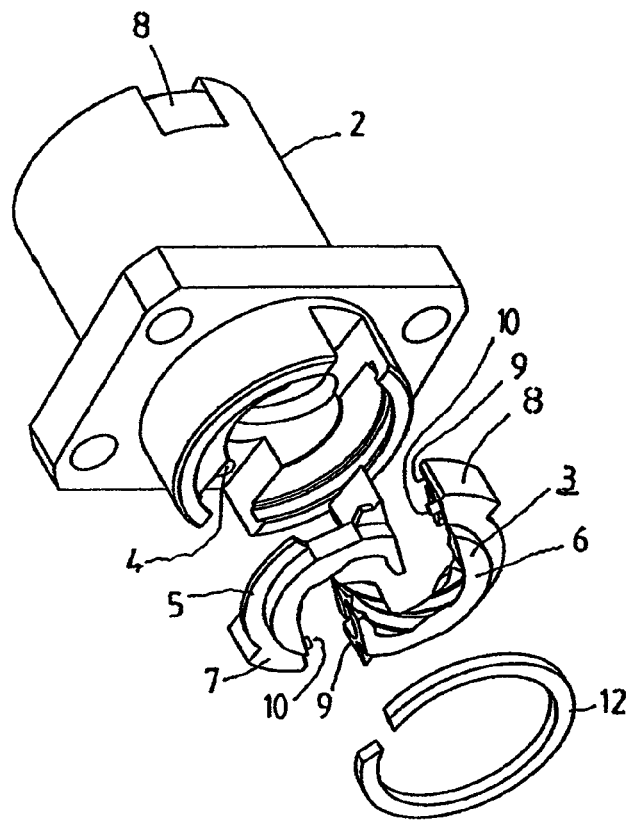
FIG. 3 represents an exploded view of a ball deflection piece with the spindle nut.

In one embodiment of the present invention, the ball deflection pieces 3 can be annular and are assembled from two substantially identically embodied circular-ring sectors 5 and 6, for example, as shown in FIG. 3. Each circular-ring sector 5, 6 can carry half of a deflection head 7, 8 which projects from the annular ball deflection piece 3, both in the direction of the return passage orifice 4 and on the circumference of the ball deflection piece 3. The deflection head 7, 8 can also be divided in a plane 9 tangential to the spindle 1.

Figure 4:
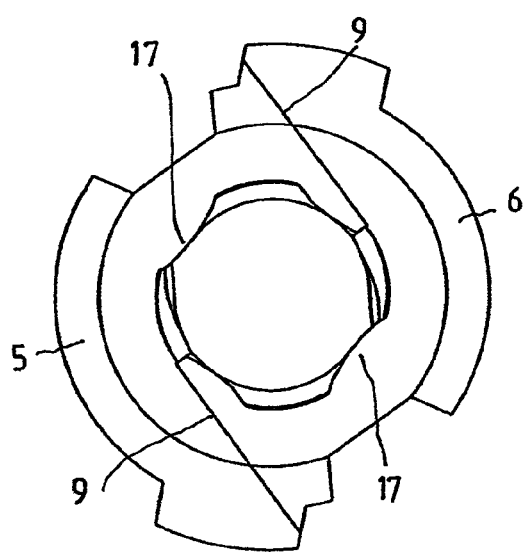
FIG. 4 represents a ball deflection piece in a top view.
Figure 5:
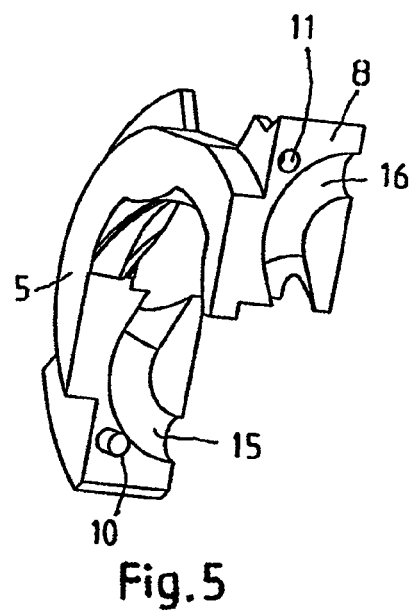
FIG. 5 represents a circular-ring sector of the ball deflection piece from a perspective side view.
Figure 6:
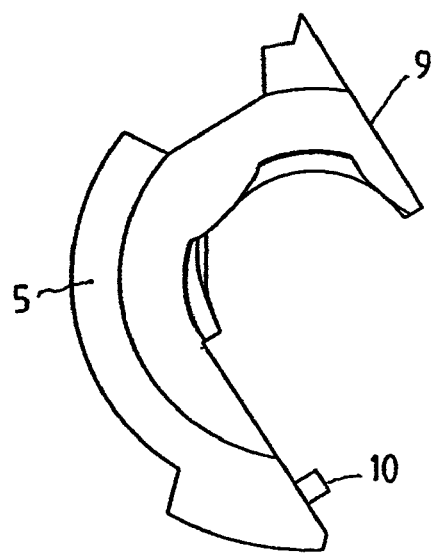
FIG. 6 represents a circular-ring sector of the ball deflection piece from a top view.
Figure 7:
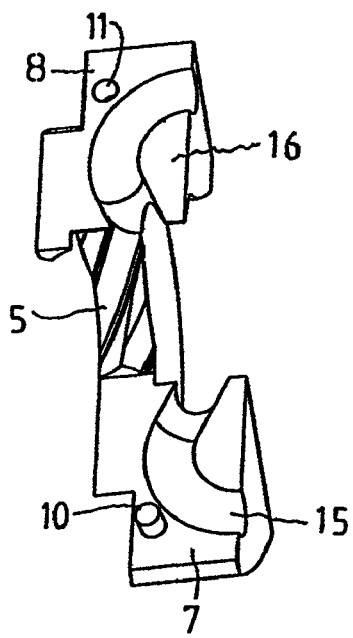
FIG. 7 represents a circular-ring sector of the ball deflection piece from a side view.

FIG. 4, shows the adjacent circular-ring sectors 5, 6 abut on one another in plane 9. The adjacent circular-ring sectors 5, 6 can be held together by pin 10/blind hole 11 connections, for example, as shown in FIGS. 5 through 7. Before the mounting of the ball deflection piece 3, the pins 10 are introduced into the blind holes 11, and the ball deflection piece 3 is thus inserted into the spindle nut 2 as one piece, in which spindle nut can be fastened with a snap ring 12.

In one embodiment of the present invention, FIG. 4 further shows dirt-scraping tabs 17 which can be integrated into the spindle nut 2.

FIGS. 5, 6, and 7 show the circular-ring sectors 5, seen from a different side view. For example, FIG. 5 shows the parting surface of the circular-ring sector 5. The parts of the ball circulation passages 15, 16 are visible. In one embodiment, after the annular ball circulation piece 3 has been assembled, the parts of the ball circulation passages 15, 16 interact with the parts of the ball circulation passages 15, 16 of the abutting circular-ring sector 6 facing them and generate a ball circulation passage beginning in the working passage defined by grooves provided on the spindle and spindle nut (see, e.g., FIG. 2) and ending before the return passage orifice 4.

Figure 8:
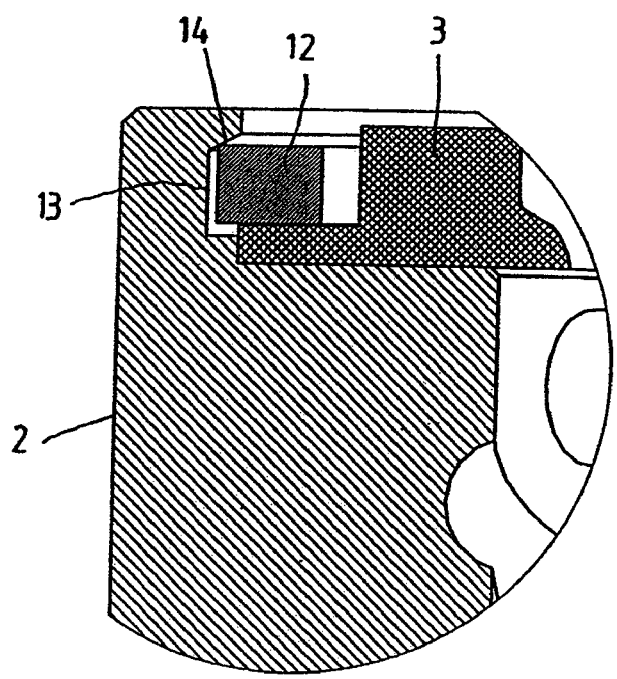
FIG. 8 represents a snap ring fastening of the ball deflection piece in a section view.

FIG. 8 shows a partial cross-sectional view of the spindle nut 2 with the ball deflection piece 3 inserted into an annular groove 13 in the spindle nut 2 and the snap ring 12. In one embodiment, in order to counteract an outward movement of the ball deflection piece 3 out of the spindle nut 2 during operation, the orifice of the annular groove 13 in the spindle nut 2 can have a slanted structure tapering outward. For example, this slanted surface 14 can push back the snap ring 12 holding the ball deflection piece 3 and thus prevent an outward movement.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A recirculating ball screw and nut drive comprising:
   a spindle;
   a spindle nut guided on the spindle;
   balls guided between the spindle and the spindle nut, in a working passage defined by grooves of the spindle and spindle nut;
   deflection pieces arranged on both ends of the spindle nut to divert the balls out of the working passage into a return passage accommodated in the spindle nut, and to divert the balls out of the return passage into the working passage accommodated in the spindle nut, wherein the ball deflection pieces are annular and composed of at least two circular-ring sectors;

deflection heads coupled in part to each circular-ring sector, such that the deflection head is divided in a plane tangential to the spindle when mounted on the spindle nut, wherein the deflection heads project axially in the direction of an orifice of the return passage and radially on the circumference of the ball deflection pieces; and a pin and blind hole formed on the at least two circular-ring sectors to hold the ring sectors together in the vicinity of the deflection head in the plane tangential to the spindle.

2. The recirculating ball screw and nut drive according to claim 1, wherein the circular-ring sectors further comprise ball circulation passages arranged between the working passage and the return passage, which are formed in part in facing surfaces of the circular-ring sectors facing one another.

3. The recirculating ball screw and nut drive according to claim 2, further comprising a radially directed recess in the spindle nut body, wherein the deflection head projecting radially on the circumference of the ball deflection piece is placed into the radially directed recess in the spindle nut body to protect the ball deflection piece from twisting.

4. The recirculating ball screw and nut drive according to claim 1, further comprising a snap ring arranged to hold the ball deflection piece in an annular recess in the spindle nut body.

5. The recirculating ball screw and nut drive according to claim 4, wherein the spindle nut body comprises an annular groove with a slanted orifice tapering outward to hold the snap ring.

\* \* \* \* \*